United States Patent

[11] 3,599,874

[72] Inventors Felix Hom
 La Mesa;
 Earl B. Potter, El Cajon, both of, Calif.
[21] Appl. No. 21,881
[22] Filed Mar. 23, 1970
[45] Patented Aug. 17, 1971
[73] Assignee Rohr Corporation
 Chula Vista, Calif.

[54] THRUST-REVERSING APPARATUS
 8 Claims, 4 Drawing Figs.
[52] U.S. Cl. ........................................................ 239/265.29,
 239/265.37
[51] Int. Cl. ....................................................... B64c 15/04
[50] Field of Search ........................................... 239/265.29,
 265.31, 265.37

[56] References Cited
 UNITED STATES PATENTS
2,753,684 7/1956 Greene ........................... 239/265.29
2,847,823 9/1958 Brewer ........................... 239/265.29
3,024,599 3/1962 Keen .............................. 239/265.37

*Primary Examiner*—Lloyd L. King
*Attorney*—George E. Pearson

ABSTRACT: Apparatus comprises elongate shell coaxial with engine, extending rearwardly and open at aft end, to surround and control jet stream. Aft portion of shell is a sleeve slidably mounted to main body of shell for fore and aft translation. In forward position it is a streamline continuation of the shell. In aft position it opens a peripheral outflow gap between rear edge of main body and forward edge of sleeve. Blocker doors around inside of sleeve are pivoted at their leading edges to leading edge of sleeve. Drag links pivotally connected to center body and doors cause them to swing in toward axis of shell on rearward movement of sleeve to block rearward flow of jet stream and force it through outflow gap for reverse thrust. Deflector doors pivotally mounted at the forward end of the sleeve are linked to blocker doors to swing to forwardly divergent attitude when sleeve is moved to rearward position to increase the forward vector of the jet stream issuing through the outflow gap. The shell may be a shroud surrounding the engine or it may be the primary jet nozzle.

THRUST-REVERSING APPARATUS

BACKGROUND OF THE INVENTION

This invention lies in the field of gas turbine engines, commonly called jet engines, which produce reaction thrust by ejecting a high velocity stream of gas from the exhaust nozzle of the gas turbine, in some cases mixed with fan air or free stream air. Airplanes driven by jet engines fly and land at much higher speeds than propeller driven airplanes. Their high landing speed puts a great burden on the wheel brakes and of course they do not have propellers which are readily reversible to produce reverse thrust. Therefore, it is necessary to provide apparatus to reverse the gas stream to accomplish this result.

Various types of thrust reversers have been in use for many years. All of them utilize a basic principle of blocking the rearward flow of the jetstream and diverting it laterally. If the diverted stream has no forward component it will act in the manner of a thrust spoiler which is relatively ineffective. Normally, however, the stream is directed substantially forward to produce an actual reverse thrust. A common type has lateral openings in the wall of the nozzle or other housing which extends rearwardly to control the jetstream, with deflector doors in the openings which close them in stowed position. For reverse thrust the doors are swung inwardly and rearwardly with their trailing edges meeting at the center of the housing to block rearward flow, and the doors diverge forwardly to guide the diverted jetstream outwardly and forwardly.

It is difficult to devise doors which are long enough to meet at the center and short enough not to extend unduly into the airstream without losing the forward component effect. The addition of end plates for the doors to increase the forward component or vector increases the weight and complexity of the installation to an undesirable degree.

SUMMARY OF THE INVENTION

The present invention obtains the advantages mentioned above while eliminating the problem which make the prior devices unsatisfactory. Generally stated, the apparatus includes a housing or shell which may be the primary jet nozzle or a nacelle type housing which may surround the engine and extend rearwardly of the nozzle to surround and control the jetstream. The shell, which is open at the aft end, includes a fixed main body and an aft section in the form of an axially movable sleeve which is slidably supported by the main body. In its forward position, the sleeve meets with the main body to form a streamline continuation. In its aft position, a peripheral outflow gap is formed between the aft end of the main body and the forward end of the sleeve.

A plurality of blocker doors lie around the inner wall of the sleeve and are pivotally mounted on transverse axes to the forward end of the sleeve so that they may swing inwardly toward the axis of the shell. A center body is provided within the shell on the longitudinal axis of the engine and shell, and a drag link for each door is pivoted at its inner end to the center body and at its outer end to its respective door at a point aft of the mounting axis of the door. As the sleeve moves rearwardly and opens the outflow gap, it carries the blocker doors rearwardly while the drag links swing them inward to blocking position.

It is desirable to have end plates or deflector doors to further divert the reversed jetstream and increase its forward vector. In the present case, these deflector doors form the forward end of the sleeve and are directly pivotally mounted to it at their aft ends on transverse axes so that they may swing to the desired positions. Short linkages are pivotally connected between the blocker doors and the deflector doors so that when the former swing to their blocking position they cause the latter to swing to positions diverging forward in the free airstream to produce the desired increase in the thrust vector.

The linkages are very simple and both sets of doors are mounted on the sleeve. The latter is supported by simple guide tracks on the main body and axial movement is produced by any conventional form of servo motor or linear actuator. Thus there is a minimum of parts, all of which are firmly supported, and only one set of servos is required for the entire installation. The result is lightweight, reliability of operation, and practically no maintenance.

BRIEF DESCRIPTION OF THE DRAWINGS

Various other advantages and features of novelty will become apparent as the description proceeds in conjunction with the accompanying drawing, in which.

DESCRIPTION OF PREFERRED EMBODIMENT

Figure 1:
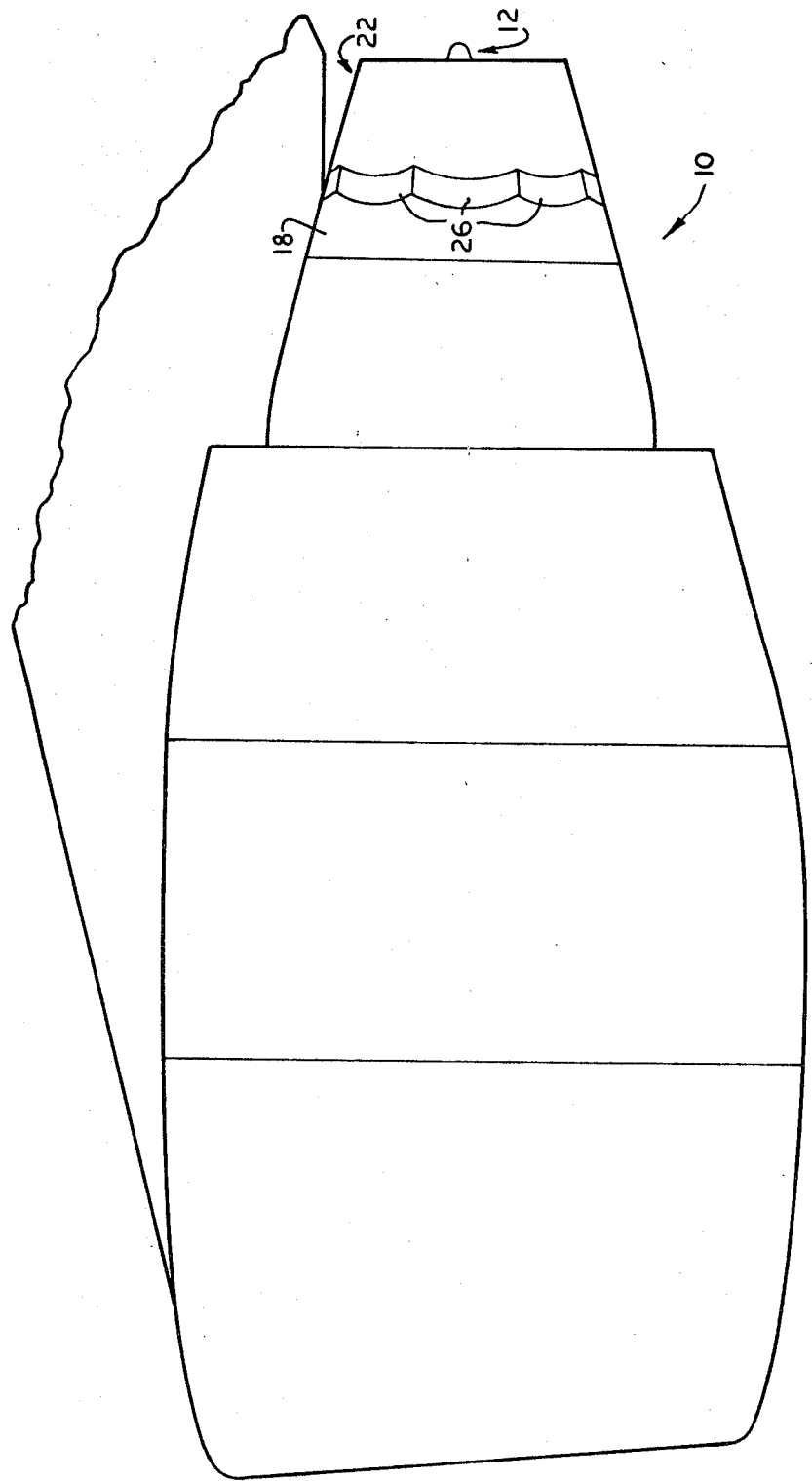
FIG. 1 is a side elevation of a preferred embodiment of this invention, illustrating the sleeve thereof in stowed position.

The apparatus of this invention is generally schematically illustrated in FIG. 1, in which the rearwardly convergently tapered shell 10 may be either the primary jet nozzle or a shroud surrounding all or part of a jet engine, not shown, and extending rearward beyond the exit end of the nozzle to surround and control the jetstream A center body 12 is located on the longitudinal axis of the engine and shell and, as shown, it tapers convergently rearward. The outer wall 14 of center body 12 and the inner wall 16 of the shell define an annular passage for the jetstream.

The shell itself is divided into a fixed main body 18 having an aft end 20 and a sleeve 22 open at its aft end and having a forward end 24 including a plurality of peripherally arranged deflector doors 26 which form a part of the streamline contour of the shell. The leading edges 28 of the doors thus constitute the leading edge of the sleeve and in stowed position mate with the aft end 20 of the main body to form a complete enclosure for the jetstream.

The sleeve is mounted for support and axial movement by means of a plurality of longitudinally extending beams 30 fixed to the sleeve and axially slidable in support and guide tracks 32 fixed to the main body and located between its inner and outer walls. A servo motor 34 of any suitable type is located at the forward end of each guide track and actuates the beams in response to suitable control signals.

Figure 3:
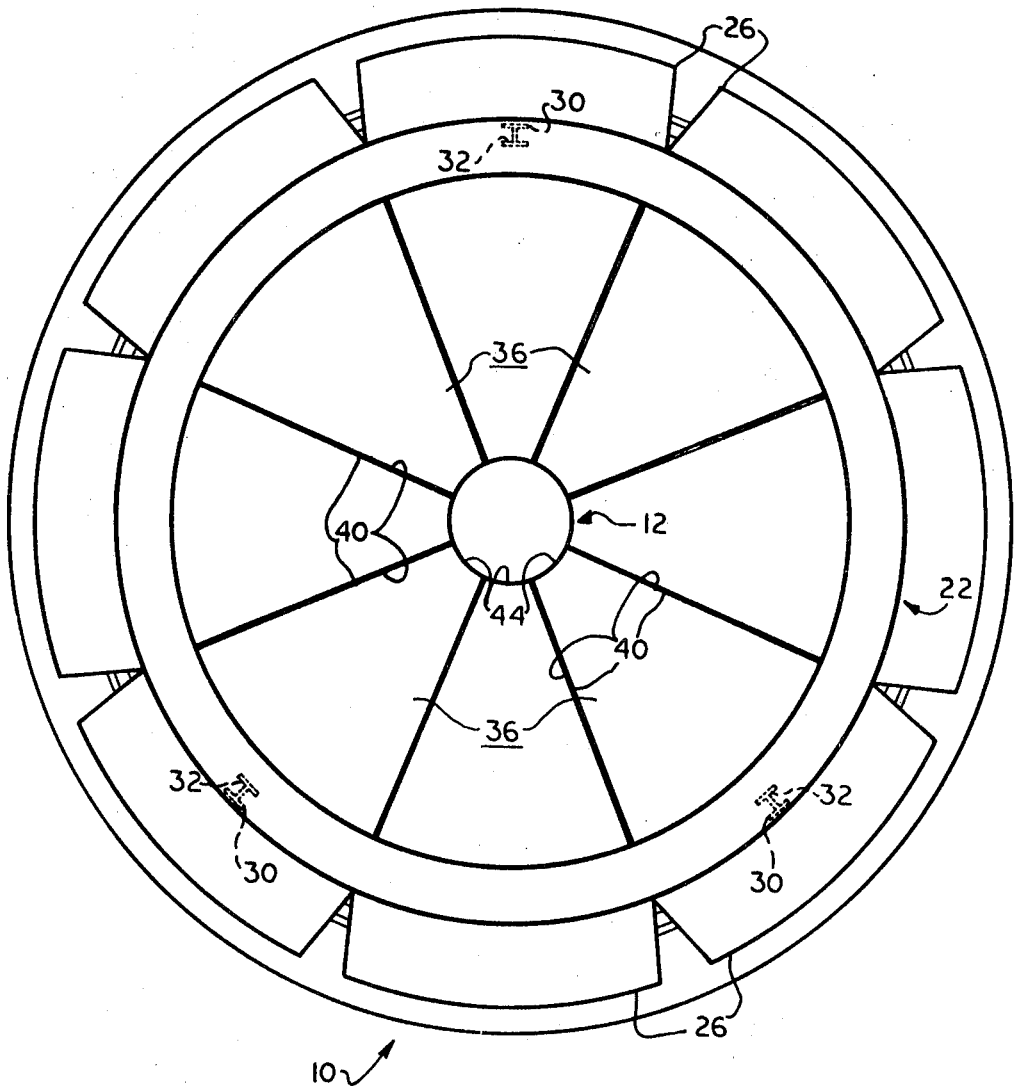
FIG. 3 is a rear view taken along the plane represented by line 3—3 in FIG. 2 and showing blocker and deflector doors deployed.

A plurality of blocker doors 36 are arranged around the inner wall of sleeve 22 with their leading edges 38 forming a substantially continuous ring around the forward end 24. Each door 36 is rearwardly convergently tapered in planform so that its side edges 40 define an acute included angle as best seen in FIG. 3. The leading edge 38 of each door is pivotally mounted at 42 to the forward end of the sleeve about a transverse axis so that its aft end 44 may swing inward toward the center body on occasion. This swinging is controlled by a drag link 46 which is connected at its inner end to the center body by pivot 48 and at its outer end to its respective blocker door by pivot 50 which is located aft to the door pivotal mountings 42. Pivots 48 lie in a transverse plane adjacent to the transverse plane of the pivots 42 for the blocker doors when the sleeve is in its first, forward position so that the links diverge rearwardly at a small angle to the transverse plane of pivots 48. In this position, the longitudinal axis of each link is at an angle to the longitudinal axis of its respective door approaching a right angle so that it will forcefully maintain the door in stowed position during normal cruising flight.

Figure 4:
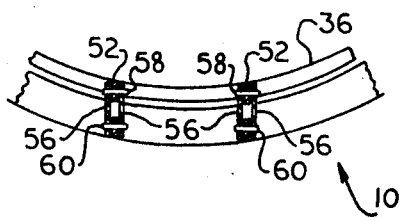
FIG. 4 is a fragmentary sectional view taken along the plane represented by line 4—4 in FIG. 2.

Leading edge 38 of each blocker door includes a bracket 52 extending slightly forward of its pivots 42. Each deflector door 26 is connected at its aft end to sleeve 22 by pivots 54 having a transverse axis. A link 56 is pivotally connected at its inner end to the forward end of bracket 52 by pivot 58 and at its outer end to deflector door 26 by pivot 60 in general parallelogram fashion (see FIGS. 2 and 4) so that swinging movement of the blocker door about is pivotal mounting will produce the desired swinging of the deflector door.

Figure 2:
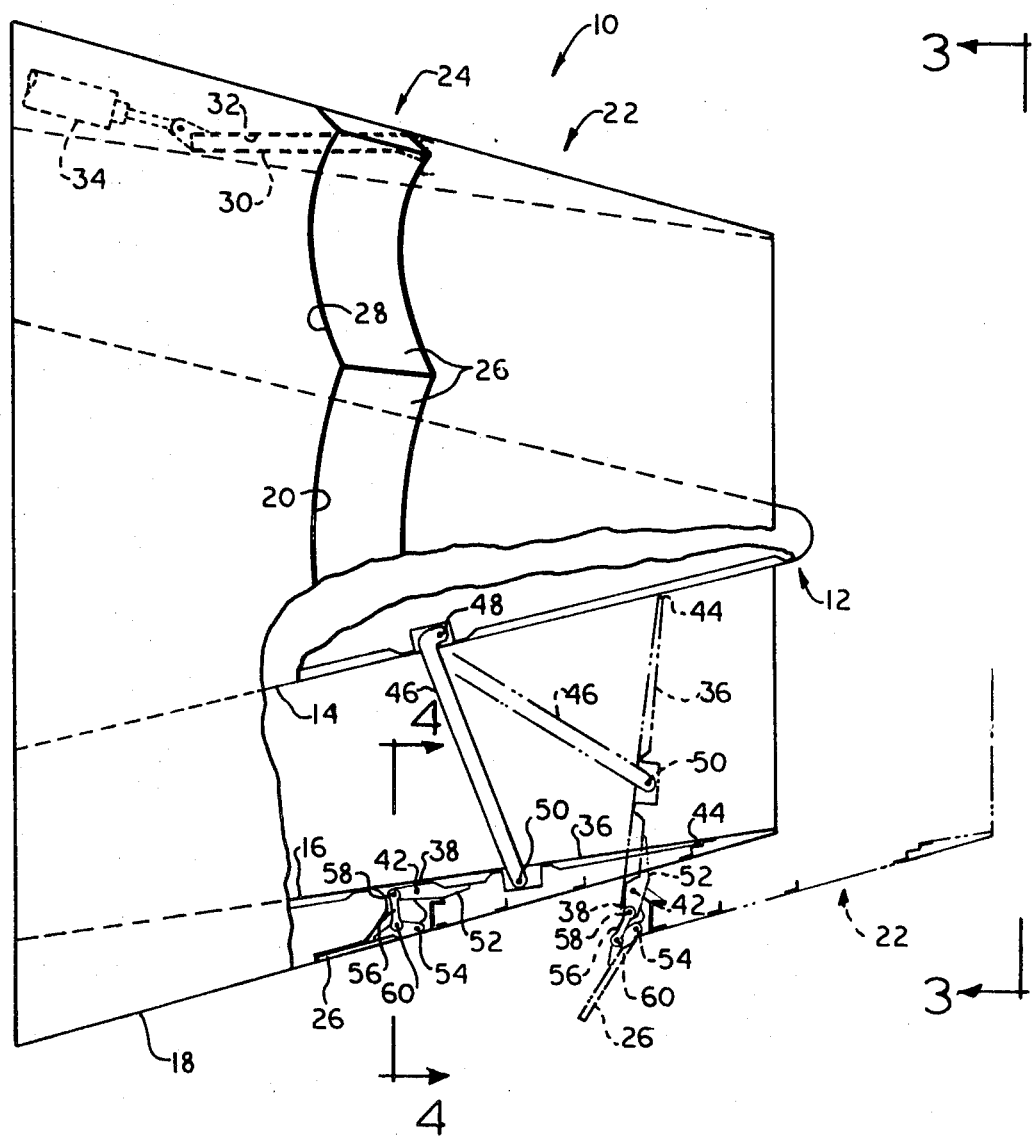
FIG. 2 is another side elevation of the aft portion of the apparatus of FIG. 1, with parts broken away so that internal structure can be seen and phantom lines illustrating the deployed position of the aforesaid sleeve.

When sleeve 22 moves axially rearward to its second position, actuated by servo motor 34, it is located as indicated by broken lines in FIG. 2, and it will be seen that a peripheral outflow gap is formed between the aft end of the main body and the forward end of the sleeve. At the same time, the direct axial rearward movement of each pivot mounting 42 combined with the restraint of drag link 46 causes the aft end of each blocker door to swing in toward the center body. The arcuate aft ends 44 mate with the center body and the side edges 40 mate with each other to completely block rearward flow of the jetstream and force it out through the outflow gap to produce reverse thrust. The center body may be proportionately much smaller than shown, depending on various design considerations, and may terminate forward of the blocking position of doors 36. In such cases, the aft ends 44 of the doors may taper to a point and meet at the axis of the shell.

The proportions and relations of the blocker doors and drag links may be varied to produce various reversing angles. Since the angle as shown is small, the deflector doors serve to increase the effective angle and thus the reverse thrust vector. As the blocker doors swing through an angle of almost 90° during their rearward movement, the forward end of each bracket 52 swings through a corresponding angle, causing each pivot 58 to pass across a line drawn between pivots 42 and 60. As a consequence, door 26 swings to a position nearly normal to the direction of travel and then swings back to a forwardly divergent angle as shown in broken lines. The final angle is predetermined to produce the desired result and is achieved by selection of the length of link 56 and the lever arms of pivots 58 and 60.

What we claim as new and useful and desired to be secured by U.S. Letters Patent is:

1. Thrust-reversing apparatus for use in combination with a jet engine adapted to produce reaction thrust by rearward emission of a gaseous jetstream, comprising: an elongate shell having a generally annular cross section and arranged substantially coaxially with the engine; said shell being open at its aft end and being adapted to surround and control the jetstream; said shell including a fixed main body and an aft section in the form of an axially movable sleeve; support means on said main body to support the sleeve for said axial movement between a first, forward position in which the forward end of the sleeve engages the aft end of the main body in sealing relation and a second, aft position in which the forward end of the sleeve is spaced axially rearwardly of the aft end of the main body to produce a peripheral gap for outflow of jetstream gases; a center body within the shell located on the longitudinal axis of the engine; a plurality of blocker doors on the inner wall of the sleeve; the leading edge of each blocker door being pivotally mounted on a transverse axis to the forward end of the sleeve peripherally adjacent to the leading edges of other blocker doors to form a ring around the periphery of the shell; and a drag link for each blocker door; the inner end of each drag link being pivotally connected to the center body and the outer end of each drag link being pivotally connected to its respective door at a point aft of the mounting axis of the door; aft translation of the sleeve moving the doors and their mounting axes rearwardly and the drag links causing the doors and their mounting axes rearwardly and the drag links causing the doors to swing inwardly around their mounting axes to block flow of the jetstream and redirect it through the peripheral outflow gap.

2. Apparatus as claimed in claim 1; the drag links being so located and dimensioned that, with the sleeve in its first, forward position, the longitudinal axis of each drag link is at an angle to the longitudinal axis of its respective door approaching a right angle to forcefully maintain the door in stowed position.

3. Apparatus as claimed in claim 1; said shell being the primary exhaust nozzle of the engine.

4. Apparatus as claimed in claim 1; said doors being rearwardly convergently tapered in planform at such an angle as to cause their side edges to contact in substantially sealing relation in fully deployed position.

5. Apparatus as claimed in claim 1; said center body having a substantial lateral dimension and being annular in cross section; the trailing edges of said doors being arcuate for contacting said center body in sealing relation when fully deployed.

6. Apparatus as claimed in claim 1; the inner pivotal axes of the drag links lying in a transverse plane adjacent to the transverse plane of the mounting axes of the doors when the sleeve is in its first, forward position to cause said links to diverge rearwardly.

7. Apparatus as claimed in claim 1; the forward end of the sleeve including a plurality of deflector doors arranged end to end around the periphery of the sleeve; each door being pivotally mounted to the sleeve about a transverse axis; and means to swing said doors to positions diverging forwardly when the sleeve is moved to its second, aft position to increase the forward vector of the jetstream issuing from the peripheral outflow gap.

8. Apparatus as claimed in claim 7; the means for swinging the deflector doors comprising links pivotally connected at one end to the blocker doors and at the other end to the deflector doors; said links being actuated by the swinging movement of the blocker doors to swing the deflector doors with respect to the sleeve.